March 29, 1932. D. D. HIGGINS 1,851,835
MECHANICAL TIME DRIFT RECORDER
Filed Oct. 16, 1930 3 Sheets-Sheet 1

Inventor
Dana D. Higgins

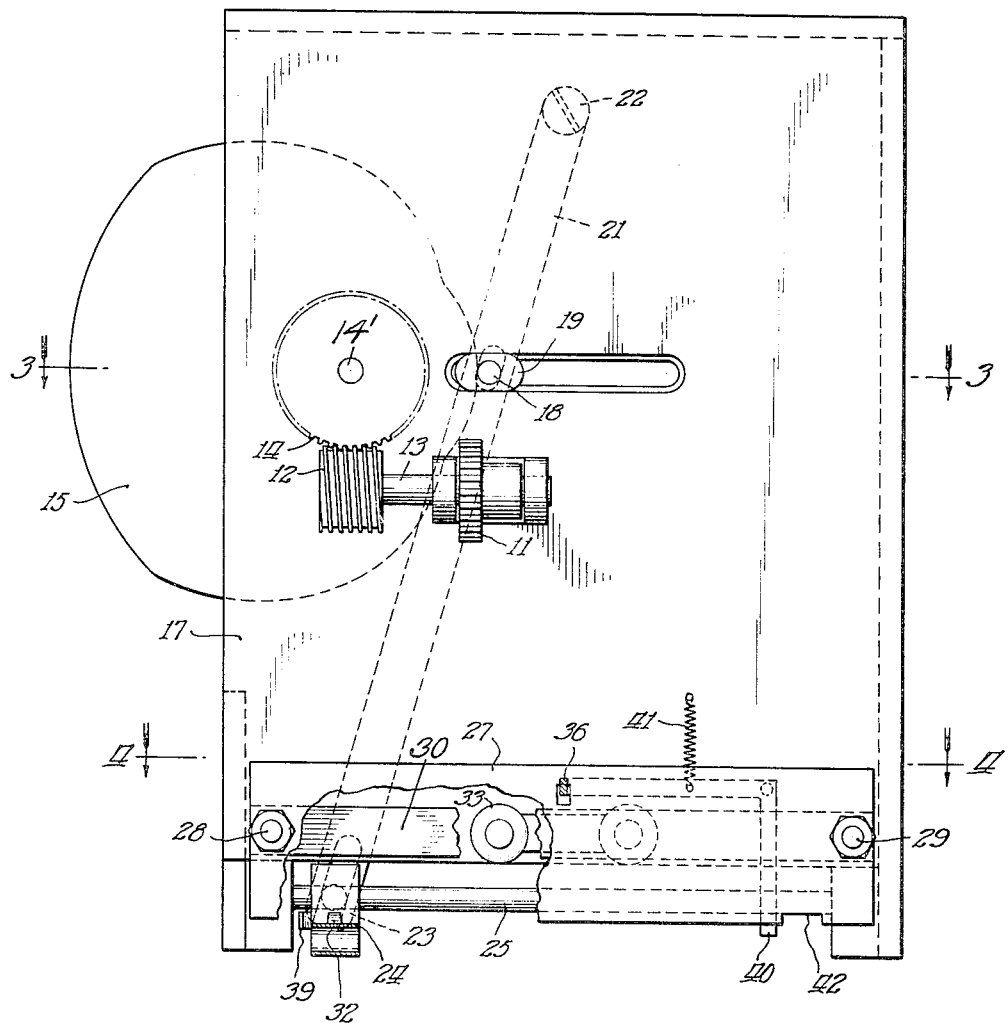

March 29, 1932.   D. D. HIGGINS   1,851,835
MECHANICAL TIME DRIFT RECORDER
Filed Oct. 16, 1930   3 Sheets-Sheet 3
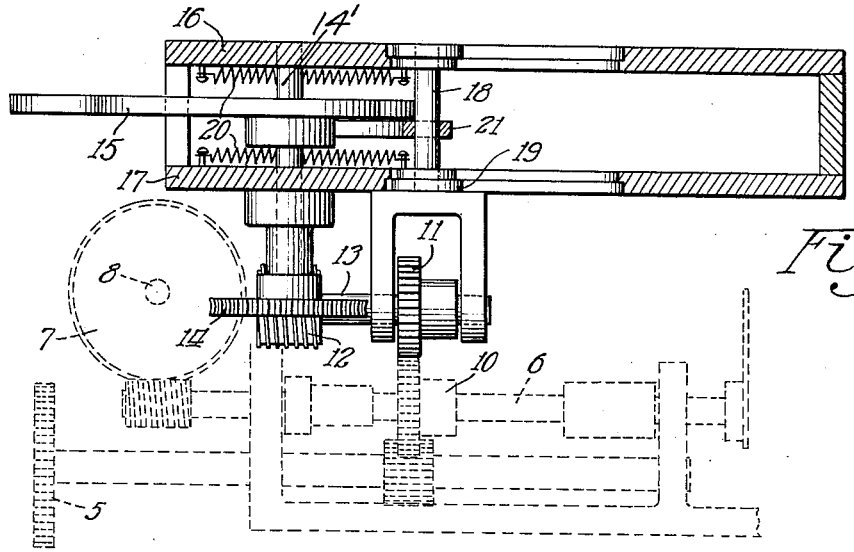
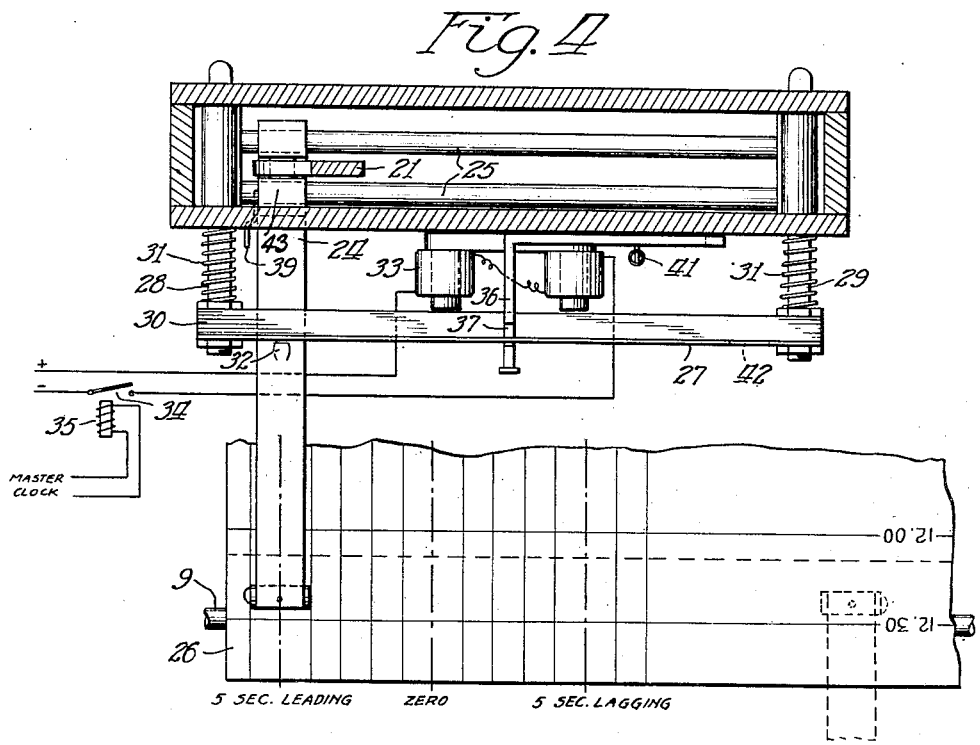
Inventor
Dana D. Higgins Patented Mar. 29, 1932

1,851,835

UNITED STATES PATENT OFFICE

DANA D. HIGGINS, OF CHICAGO, ILLINOIS, ASSIGNOR TO ASSOCIATED ENGINEERS COMPANY, OF CHICAGO, ILLINOIS, A CORPORATION OF ILLINOIS

MECHANICAL TIME DRIFT RECORDER

Application filed October 16, 1930. Serial No. 489,125.

My invention relates to recording devices and particularly to a device for recording continuously the deviations or errors in travel due to changes in speed of one device with respect to another taken as a standard whereby the record formed indicates the amount ahead or behind the one device is with respect to standard at any time after starting.

In the particular device shown, the invention is applied to a power system to record the drift or error in the time which would be shown by a synchronous motor driven clock operated from the power system when compared to a standard or master clock.

This device, as shown, is an attachment for a motor driven frequency recorder, and the timer error or time drift recorder is driven from the same motor that drives the frequency recorder.

I will describe one form which my invention may take by reference to the accompanying drawings wherein—

Fig. 2 is a front view taken substantially on the line 2—2 indicated in Fig. 1;

Fig. 3 is a section on the line 3—3 of Fig. 2 certain portions of the drive mechanism being shown dotted in order to distinguish the old from the new structure; and Fig. 4 is a view taken on the line 4—4 of Fig. 2 with the pen and also the chart roller shown in connection therewith.

Figure 1:
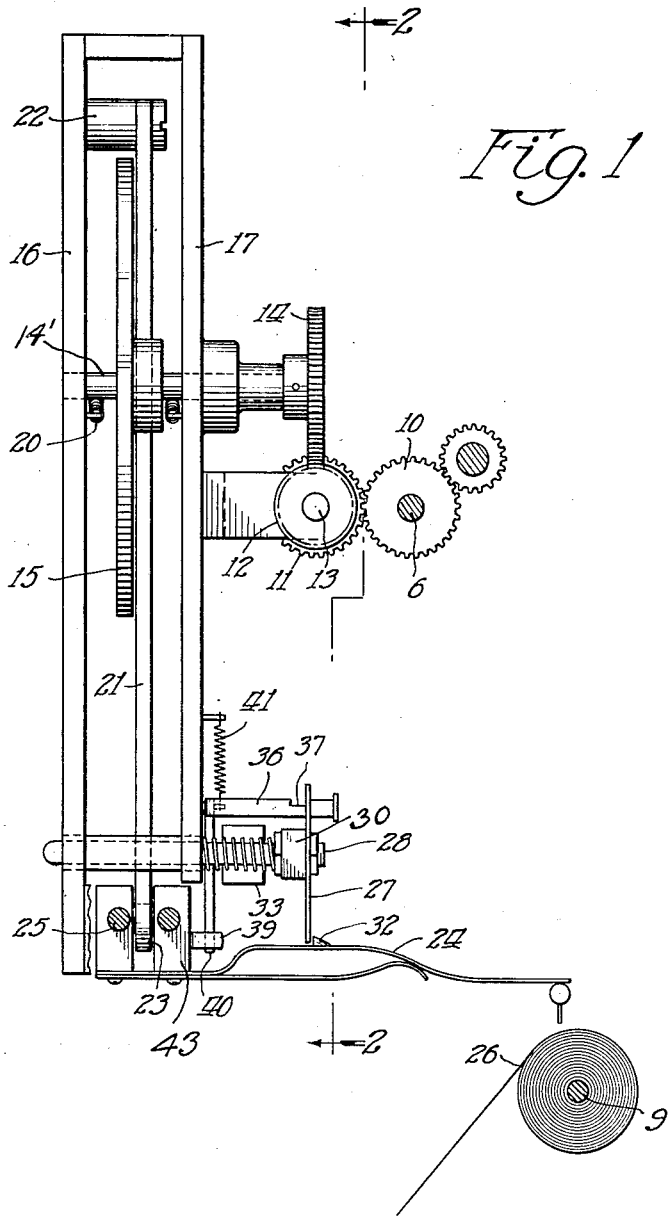
Fig. 1 is an end view partly in section of the time drift recorder.

In general, the operation of my device is as follows: The rotating motion of the synchronous motor, not shown, is converted by the mechanism shown into a uniform linear motion of a pen which reciprocates transversely over a recording paper chart without continuously marking on it. The units of pen travel distance are considered units of elapsed time and are so marked upon the recording chart. The position of the pen is compared with the time of a standard pendulum clock every minute. An electric circuit closed by the pendulum clock operates an electromagnet which causes the travelling pen to make a dot on the paper. This dot, if started on the central zero line of the chart, will continue to be made on this line so long as the frequency time checks with the master clock time. If the frequency is low and the frequency time therefore is lagging, the pen will not have reached the zero line when the clock makes contact and will record on the slow side of the zero line, the distance from the zero line being proportional to the time difference. When the frequency is faster, the frequency time will cause the pen if the pen were started on the zero line to pass the zero point of the chart when the clock makes the contact, and the recorded point will be made on the fast side of the zero line.

The mechanism by which these operations are obtained will now be described in detail.

Referring particularly to Figs. 1 and 3, the gear shown at 5 in dotted lines in Fig. 3 and its shaft may be driven from the synchronous motor. The shaft in turn drives an intermediate shaft 6 which shaft drives through the gear 7 a third shaft 8 which may be geared to the shaft 9 operating the record chart roller. This mechanism so far described is a well known mechanism such as is used with a frequency recorder of the Leeds and Northrup type.

My invention is attached to the frame of such a recorder and receives its power from a gear 10 on shaft 6 which connects with gear 11 so as to drive the worm 12 on shaft 13 and thus rotate worm gear 14 on shaft 14' to drive the cam 15, mounted between the frame pieces 16 and 17, at a rate approximately one revolution per minute. The cam 15 operates upon a suitable roller 18 (Figs. 2 and 3) to move the slides 19 (Figs. 2 and 3) away from the axis of the cam, the springs 20 serving to return the slides toward the axis of the cam as the cam face recedes. An arm 21 pivoted at 22 to the frame and slotted to receive the roller 18 is connected at 23 to the pen carrying arm 24 by means of a pin and slot connection. The pen arm 24 is carried by a pair of guide rods indicated at 25 so that as the arm 21 swings to and fro in response to the rotation of the cam, it will move the pen carrying arm 24 to and fro along the guide rods 25. The cam 15 is preferably cut so as to give fifteen seconds travel between ends of the pen path in each direction and a fifteen second rest at each end. In this fashion, the pen is caused to reciprocate to and fro above the recording chart 26 which is moved in timed relation thereto by the old mechanism hereinbefore referred to.

Now in order to periodically cause the pen to make contact with the chart, I provide an elongated plate 27 which lies directly above the pen carrying arm 24 and extends across the full width of the arm throw. This plate is connected to the frame consisting of the members 16 and 17 by means of the rods 28 and 29 which are fixed to the frame and on which the supporting bar 30 for the plate 27 is slidable. Suitable springs 31 serve to hold the plate normally in its outermost position, that is, the farthest distance away from the frame. In order to cause the plate to depress the pen, there is provided a projection 32 upon the pen arm which is just enough higher than the lower edge of the plate to effectively force the pen into contact with the chart if the plate is drawn over this projection, the pen arm, of course, being resilient. The plate 27 is shown in the innermost position just after it has caused the pen to mark the chart. The plate is attracted to this position once each minute by means of the electromagnet indicated generally by the numeral 33, this magnet being energized from a suitable source of current by closing the contacts 34 of the relay 35. This relay is energized once each minute by the master clock in a well known manner which it is believed need not be further shown as the details thereof form no part of this invention.

Electromagnet 33 when energized attracts the plate 27 and its supporting bar 30 in the manner hereinbefore described, and the succeeding action is as follows:

The pen upon being depressed is immediately released by the passage of the plate 27 beyond the projection 32 toward the frame. In this attraction of the plate 27, however, a locking bar 36 catches the plate in a notch 37 and prevents it from again moving outward upon release of the magnet 33 which is immediate. Plate 27 is then held in the position shown in Fig. 1 while the arm 24 continues its movement to the end of its stroke. Preferably the recording is done on the stroke from right to left. On the return stroke nothing happens to depress the pen as the plate 27 is retained in the position shown.

Now, however, at the end of this return stroke, a trip arm 39 on the pen carrying block 43 strikes the lower end 40 of the member 36 and causes it to release the plate 27 by moving the notched portion 37 downward against the tension of the spring 41. The springs 31 force plate 27 outwardly and at this instant the projection 32 is in alignment with the notch at 42 (Fig. 2) cut in the plate 27 so that the plate can pass over the projection without depressing the pen.

This completes one cycle of operation, and, upon the next advancing stroke from right to left, the pen will again be depressed by the energization of the electromagnet 33.

Assuming that the first depression of the pen was caused when it was over the zero line, then, if the next depression occurs when the pen is over the zero line, there has been no loss or gain by the frequency operated device as compared to the standard device. However, if the frequency of the frequency controlled synchronous motor driving the recording mechanism was above normal and consequently the motor rotating at too high a speed during this first minute, the pen would have passed beyond the zero line when electromagnet 33 was energized. The distance from the zero line to the point where the pen is depressed is a measure of how far ahead the pen is from where it should be and represents the amount of time gained this first minute. Assuming now that during the second minute the speed of the pen driving motor was reduced so that the time for the second complete cycle of the pen was just one minute, the pen would again pass over the zero line before being depressed and this time just as far as last time so that a line between the two pen dots would be parallel to the zero line indicating that while the speed was now right the time gained the first minute was still to be accounted for. Then, if during the third minute the pen did not make quite a complete cycle in the minute, it would be depressed before it arrived even with a line through the last dot parallel with the zero line. There would, therefore, be an indication from the chart that the speed was too low, and, if the dot was on the same or fast side of the zero line as the previous dot was, the chart would indicate that part but not all of the gain originally made had been lost. If, however, the dot was on the slow side of the zero line, it would indicate that the original gain had been all lost and a net loss incurred. The position of this last dot also would indicate that the pen was moving much too slow and should be speeded up. Thus by observing the chart and correcting the speed of the motor driving the pen by correcting the system frequency, the operator can maintain an average speed that is substantially the same as that necessary to make the frequency driven clock time coincide with that of the standard clock.

From the above description, it is thought that the construction and operation of this device will be clear to those skilled in this art and the advantages thereof readily apparent.

Having thus described one specific form of my invention, what I claim as new and desire to secure by Letters Patent is:

1. In a device for recording the difference in time between a synchronous motor driven clock and a standard clock, a cam rotated in synchronism with the driven clock, means including said cam for converting the rotary motion into reciprocating motion, a pen reciprocated by said means, a record sheet adapted to move transversely of the path of said pen, and means controlled by the standard clock for periodically causing said pen to contact with said sheet.

2. In a recording device, a cam rotated at a speed dependent upon the frequency, a pen, a traveling record sheet, link means connecting said cam and pen whereby to reciprocate said pen, and means for periodically depressing said pen into contact with said sheet.

3. In a recording device, a cam rotated at a speed dependent upon the frequency, a pen, a traveling record sheet, link means connecting said cam and pen whereby to reciprocate said pen, and means for periodically depressing said pen into contact with said sheet, said means comprising a sliding bar, and a master clock controlled device for sliding said bar.

4. Frequency time error recording mechanism comprising a pen, yieldable means normally holding the pen in raised position, means for reciprocating said pen at a rate dependent upon the frequency of the power system by which the frequency time is obtained, a slide, and means for periodically moving said slide in one direction, a projection on the pen holding means engaged by said slide whereby to depress said pen momentarily, and means for returning said slide to original position in one location of the pen without depressing the pen.

5. Frequency time error recording mechanism comprising a pen, yieldable means normally holding the pen in raised position, means for reciprocating said pen at a rate dependent upon the frequency of the power system by which the frequency time is obtained, a slide, and means for periodically moving said slide in one direction, a projection on the pen holding means engaged by said slide whereby to depress said pen momentarily, and means for returning said slide to original position in one location of the pen without depressing the pen, said pen reciprocating means causing said pen to pause at said location.

6. A recording device for making a record of the accumulated lag or advance of a rotating device with respect to a standard device comprising a cam rotated at a speed dependent upon the speed of the first named device, a marker, a travelling record sheet, link means connecting said cam and marker to reciprocate the marker, and means controlled by the standard device for temporarily depressing the marker into contact with the record sheet at frequent intervals.

7. A recording device for making a record of the accumulated lag or advance of a rotating device with respect to a standard device comprising a cam rotated at a speed dependent upon the speed of the first named device, a marker, a travelling record sheet, link means connecting said cam and marker to reciprocate the marker, and means controlled by the standard device for temporarily depressing the marker into contact with the record sheet at frequent intervals, said last named means comprising a sliding bar actuated from said second device.

8. A recording device for making a record of the accumulated lag or advance of a rotating device with respect to a standard device comprising a cam rotated at a speed dependent upon the speed of the first named device, a marker, a travelling record sheet, link means connecting said cam and marker to reciprocate the marker, and means controlled by the standard device for temporarily depressing the marker into contact with the record sheet at frequent intervals, said last named means comprising a bar, means for moving said bar once each interval, a member connected to the marker and actuated by said bar when moved to temporarily move the marker out of its normal path and release it, and means returning said bar to its original position each interval with the marker in its normal path during such return.

9. A device to indicate the accumulated lag or advance of a moving device relatively to a standard device with which it is to be compared, comprising a recording marker, means controlled by one of said devices moving said marker to and fro, and means controlled by the other device causing said marker to record its position at intervals governed in in length of time by said other device.

10. A device to indicate the accumulated lag or advance of a moving device relatively to a standard device with which it is to be compared, comprising a recording marker, means controlled by one of said devices moving said marker to and fro, and means controlled by the other device causing said marker to record its position at intervals governed in length of time by said other device, said first named means comprising a rotating cam, and means connected therewith for converting the rotary motion thereof into reciprocating motion, and connections from said last named means to said marker.

In witness whereof I hereunto subscribe my name this 2nd day of October, A. D. 1930

DANA D. HIGGINS